United States Patent
Payyoor et al.

(10) Patent No.: US 11,512,637 B2
(45) Date of Patent: Nov. 29, 2022

(54) TURBINE ENGINE BEARING ARRANGEMENT

(71) Applicant: General Electric Company, Schenectady, NY (US)

(72) Inventors: Narayanan Payyoor, Bangalore (IN); Peeyush Pankaj, Bangalore (IN); Richard Schmidt, Loveland, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/095,838

(22) Filed: Nov. 12, 2020

(65) Prior Publication Data
US 2022/0145798 A1 May 12, 2022

(51) Int. Cl.
*F02C 7/06* (2006.01)
*F02C 7/36* (2006.01)
*F16C 13/02* (2006.01)
*F16C 19/49* (2006.01)

(52) U.S. Cl.
CPC .................. *F02C 7/06* (2013.01); *F02C 7/36* (2013.01); *F05D 2220/32* (2013.01); *F05D 2240/24* (2013.01); *F05D 2240/52* (2013.01); *F05D 2240/54* (2013.01); *F05D 2240/60* (2013.01); *F16C 13/02* (2013.01); *F16C 19/49* (2013.01); *F16C 2360/23* (2013.01)

(58) Field of Classification Search
CPC .... F02C 7/06; F02C 7/36; F16C 13/02; F16C 19/49; F16C 2360/23; F05D 2220/32; F05D 2240/24; F05D 2240/52; F05D 2240/54; F05D 2240/60
See application file for complete search history.

(56) References Cited

U.S. PATENT DOCUMENTS

| | | |
|---|---|---|
| 4,772,179 A | 9/1988 | Bennett et al. |
| 7,195,446 B2 | 3/2007 | Seda et al. |
| 7,334,981 B2 | 2/2008 | Moniz et al. |
| 8,944,765 B2 | 2/2015 | Charier et al. |
| 10,190,496 B2 | 1/2019 | Schwarz et al. |
| 10,280,843 B2 | 5/2019 | Sheridan |
| 2010/0105516 A1* | 4/2010 | Sheridan ............... F16H 57/021 475/346 |

(Continued)

*Primary Examiner* — Igor Kershteyn
*Assistant Examiner* — Brian Christopher Delrue
(74) *Attorney, Agent, or Firm* — Dority & Manning, P.A.

(57) ABSTRACT

An interdigitated turbine assembly for a gas turbine engine, the interdigitated turbine assembly including a first turbine rotor assembly interdigitated with a second turbine rotor assembly. A first static frame is positioned forward of the first turbine rotor assembly and the second turbine rotor assembly. The first turbine rotor assembly is operably coupled to an inner rotatable component of a gear assembly. The second turbine rotor assembly is operably coupled to an outer rotatable component of the gear assembly. The static structure is connected to the first static frame. A driveshaft is operably coupled to the outer rotatable component. A first bearing assembly is operably coupled to the driveshaft and the first static frame. A second bearing assembly is operably coupled to the first static frame and first turbine rotor assembly. A third bearing assembly is operably coupled to the first turbine rotor assembly and the second turbine rotor assembly.

19 Claims, 7 Drawing Sheets

(56) References Cited

U.S. PATENT DOCUMENTS

| | | | |
|---|---|---|---|
| 2011/0130246 A1* | 6/2011 | McCune | F02C 7/36 |
| | | | 29/700 |
| 2017/0159493 A1* | 6/2017 | Snow | F02C 3/04 |
| 2017/0234157 A1 | 8/2017 | Khan et al. | |
| 2019/0017382 A1* | 1/2019 | Clements | F02C 3/10 |
| 2019/0085714 A1* | 3/2019 | Zatorski | F01D 15/12 |
| 2019/0085720 A1 | 3/2019 | Pankaj et al. | |
| 2019/0085721 A1* | 3/2019 | Pankaj | F01D 25/16 |

* cited by examiner

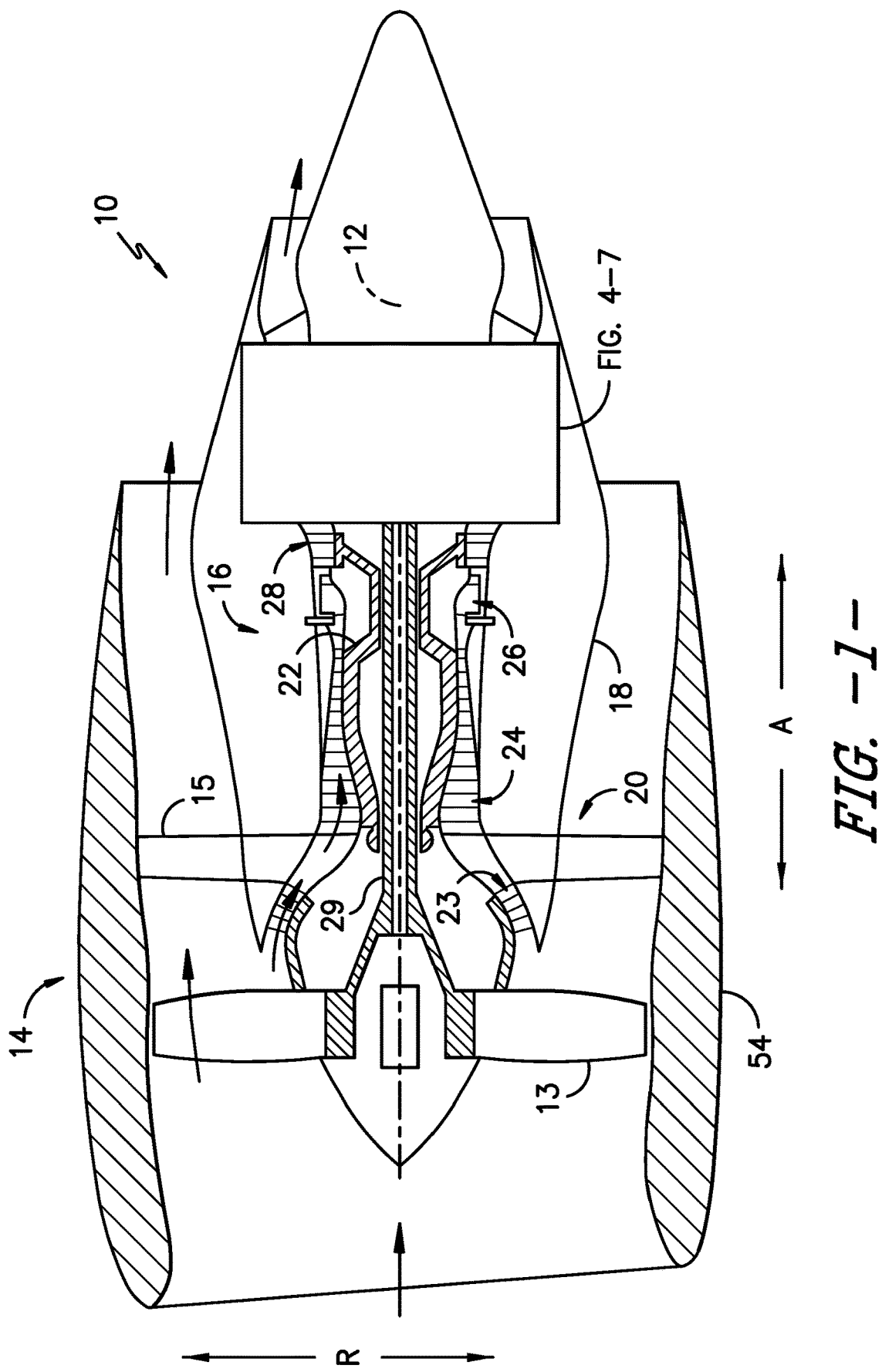
FIG. -1-

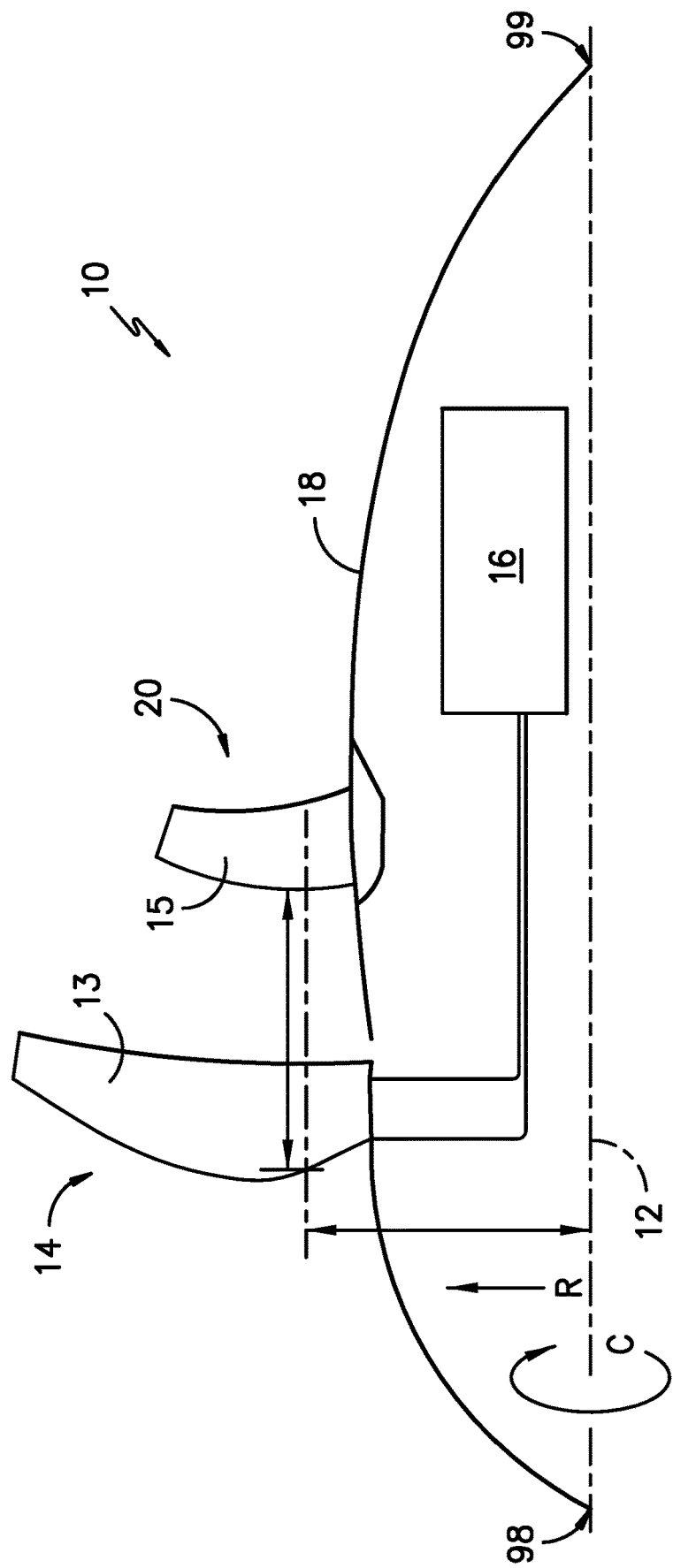

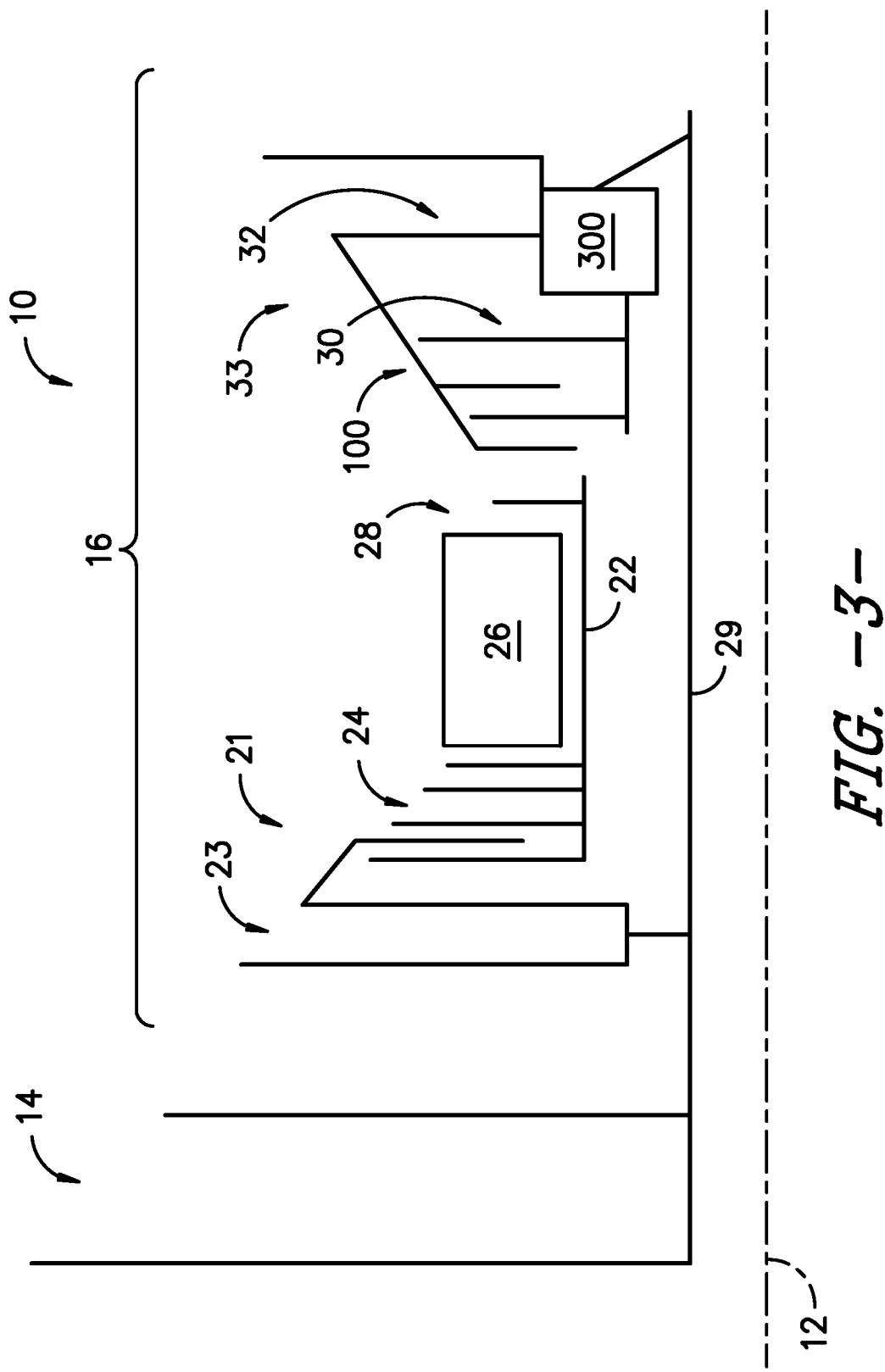

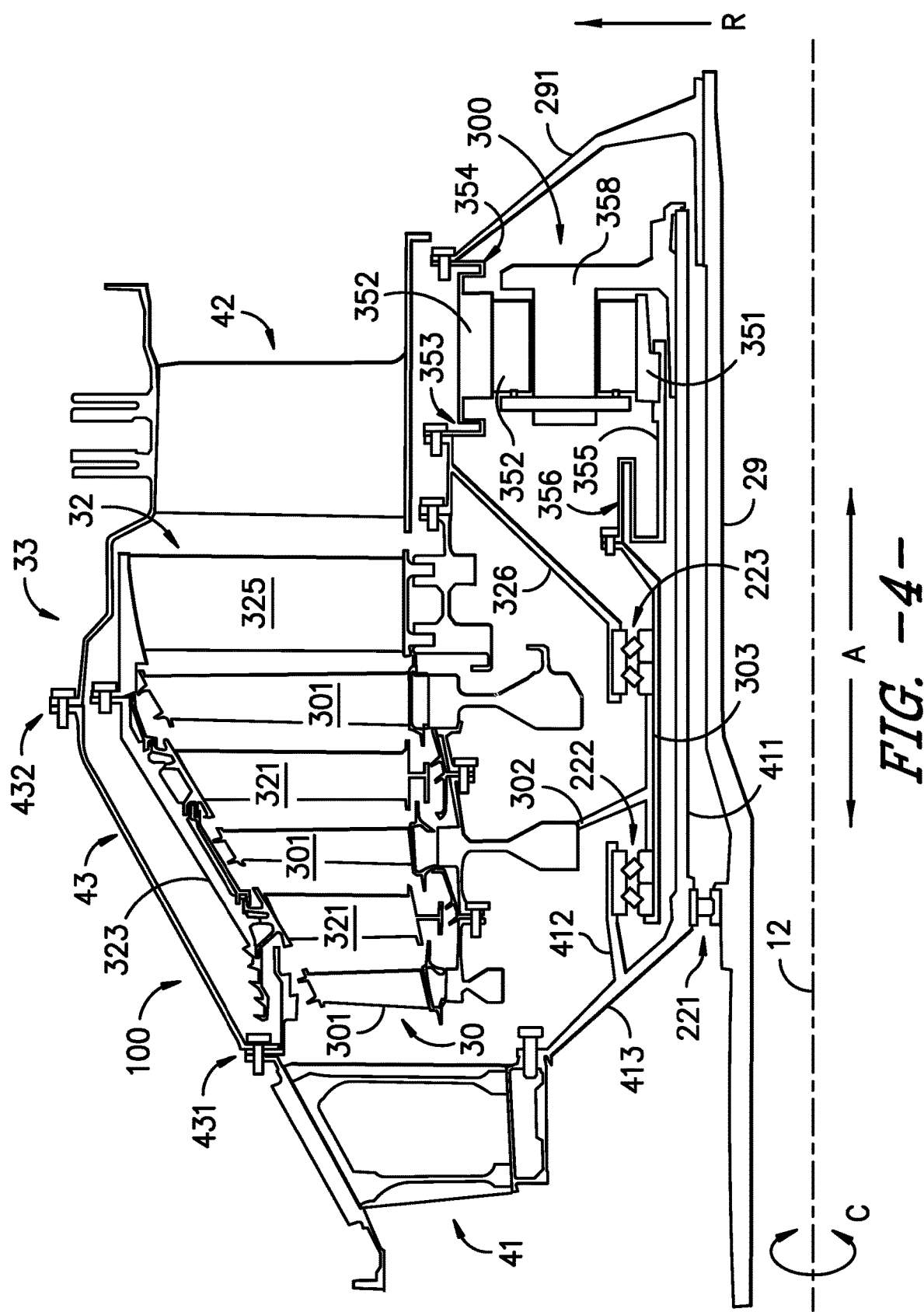
FIG. -4-

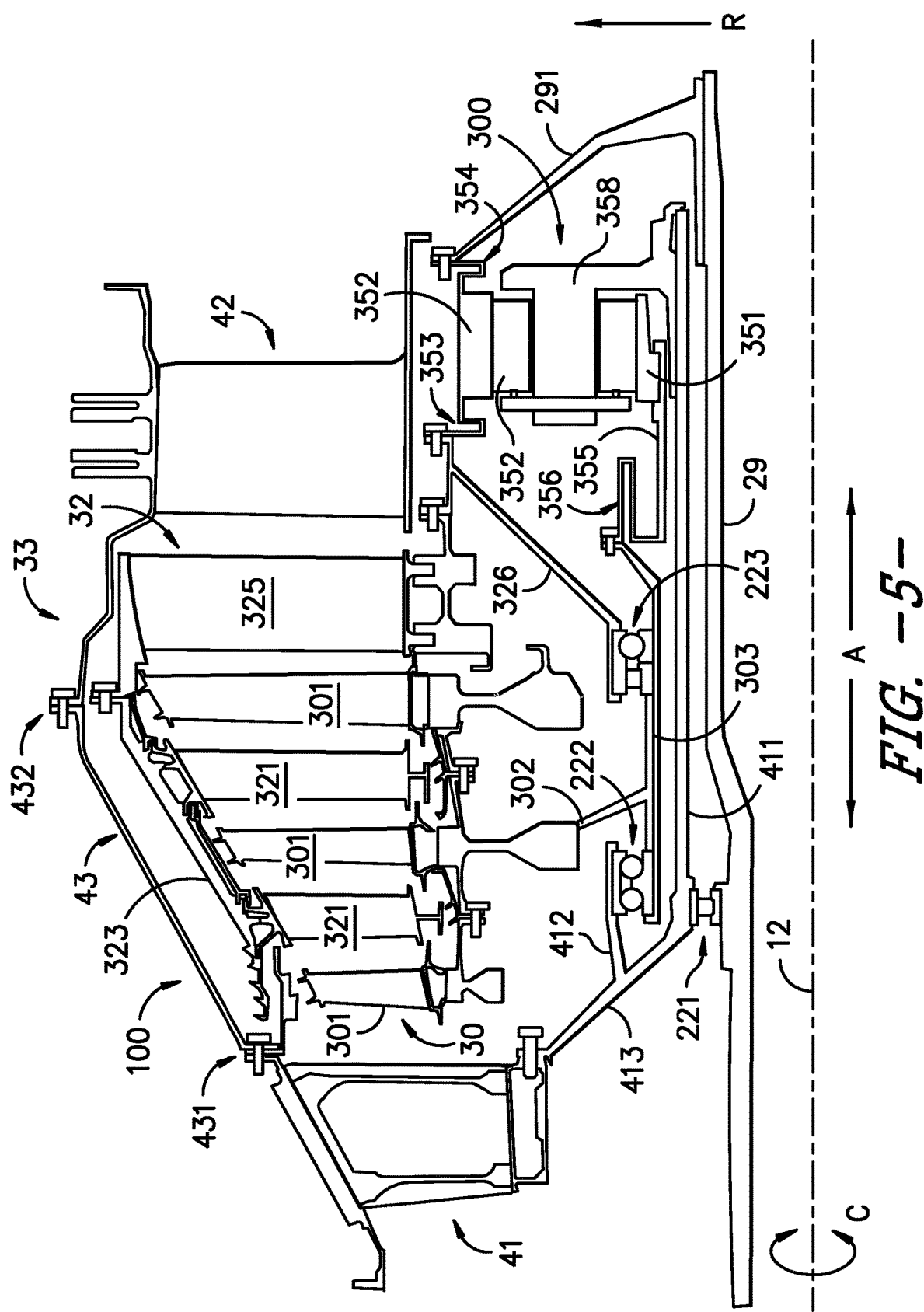
FIG. -5-

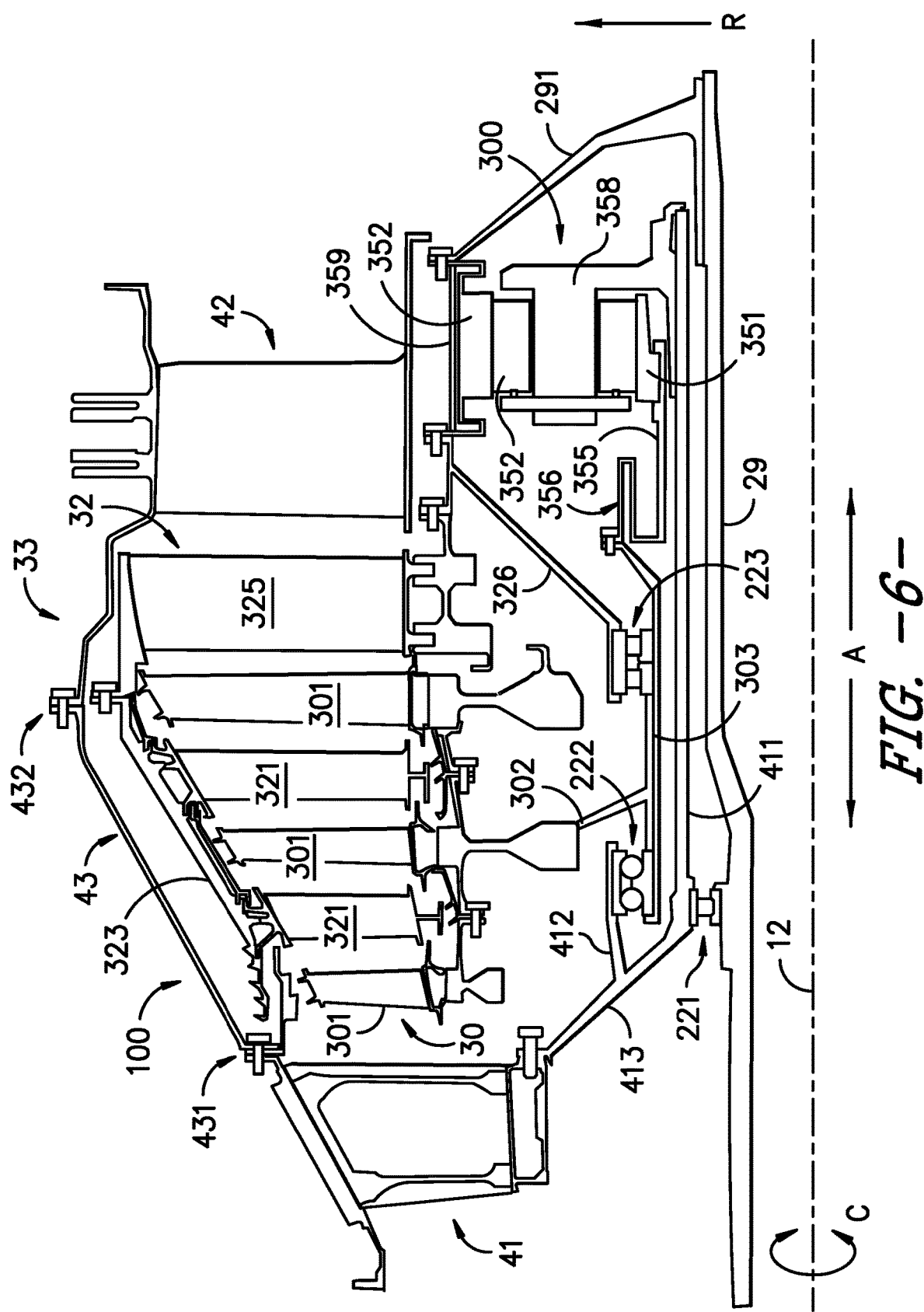
FIG. -6-

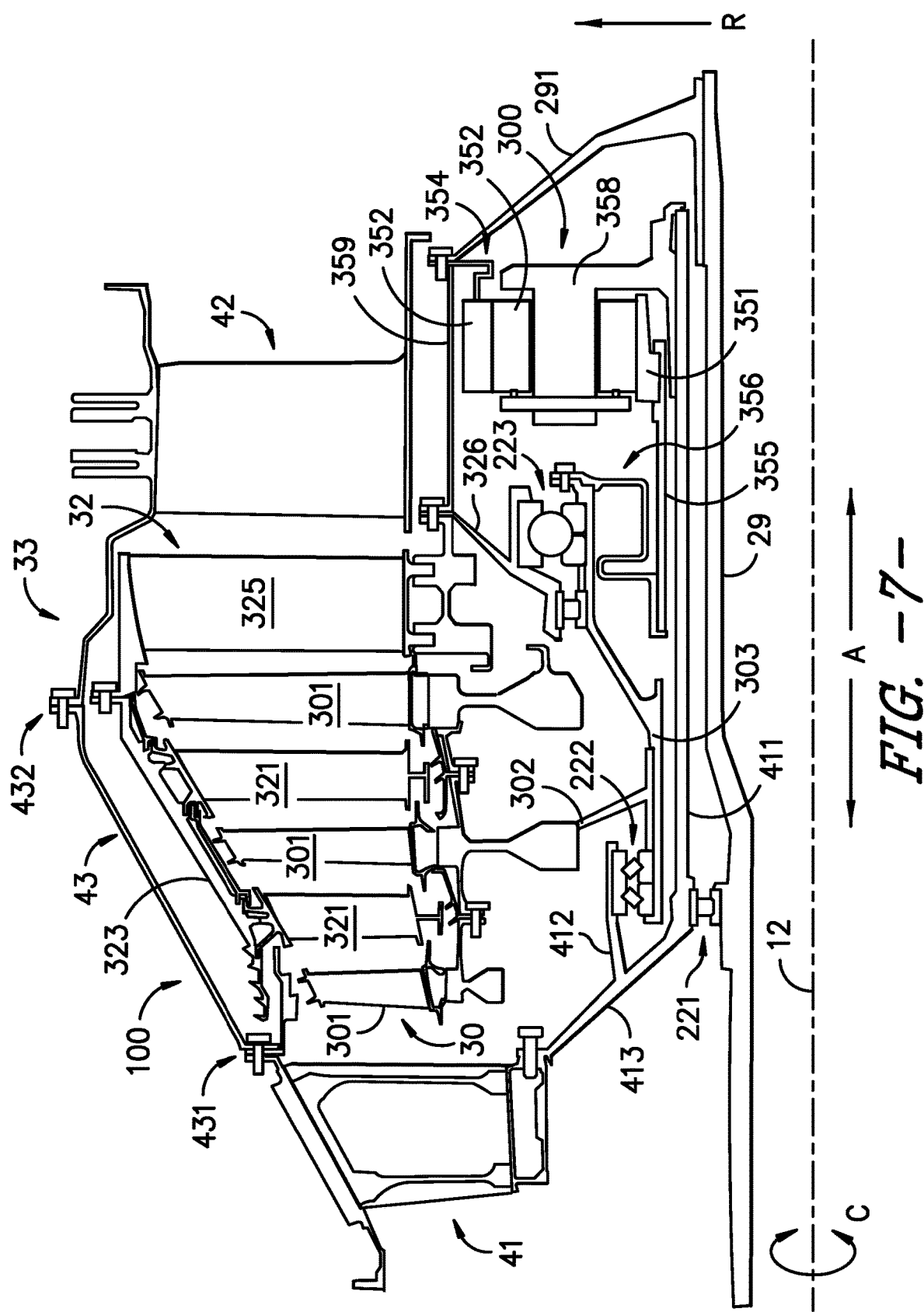
FIG. -7-

1

TURBINE ENGINE BEARING ARRANGEMENT

FIELD

The present subject matter relates generally to turbine engine bearing arrangements. The present subject matter relates particularly to turbine engine bearing arrangements for counter-rotating turbine assemblies.

BACKGROUND

Counter-rotating or interdigitated turbine assemblies may provide improved operating efficiency over conventional non-interdigitated turbine assemblies. However, counter-rotating, interdigitated, or vaneless turbine assemblies are challenged with being structurally supported as well as having undesired vibrations and rotor dynamics mitigated. Additionally, such turbine assemblies are challenged with supplying and scavenging lubricant, providing buffer and damper fluid, and other functions at bearing assemblies while mitigating undesired weight increases, system complexities, and undesired vibrations and dynamic modes. While conventional and interdigitated turbine assemblies may be faced with such challenges, interdigitated turbine assemblies are challenged with rotor-to-rotor interfaces, vibrations, and rotor dynamics unlike those of conventional, non-interdigitated turbine assemblies. As such, there is a need for bearing arrangements for counter-rotating or interdigitated turbine assemblies.

BRIEF DESCRIPTION

Aspects and advantages of the invention will be set forth in part in the following description, or may be obvious from the description, or may be learned through practice of the invention.

An interdigitated turbine assembly for a gas turbine engine, the interdigitated turbine assembly comprising a first turbine rotor assembly interdigitated with a second turbine rotor assembly; a first static frame positioned forward of the first turbine rotor assembly and the second turbine rotor assembly; a gear assembly comprising an inner rotatable component, a static structure, and an outer rotatable component, wherein the first turbine rotor assembly is operably coupled to the inner rotatable component, and wherein the second turbine rotor assembly is operably coupled to the outer rotatable component, and wherein the static structure is connected to the first static frame; a driveshaft operably coupled to the outer rotatable component of the gear assembly; a first bearing assembly operably coupled to the driveshaft and the first static frame; a second bearing assembly operably coupled to the first static frame and first turbine rotor assembly; and a third bearing assembly operably coupled to the first turbine rotor assembly and the second turbine rotor assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of an exemplary embodiment of a turbomachine engine including a core engine with a gear assembly according to an aspect of the present disclosure;

FIG. 2 is a cutaway side view of an exemplary embodiment of a turbomachine engine including a core engine with a gear assembly according to an aspect of the present disclosure;

FIG. 3 is an exemplary schematic embodiment of the engine of FIGS. 1-2 according to an aspect the present disclosure; and FIGS. 4-7 are exemplary embodiments of a portion of a turbine section including an interdigitated turbine assembly according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of gears, housings, conduits, heat exchangers, or other gear assembly components having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Referring now to the drawings, FIGS. 1-2 is an exemplary embodiment of an engine 10 including an interdigitated turbine assembly according to aspects of the present disclosure. The engine 10 includes a fan assembly 14 driven by a core engine 16. The core engine 16 is encased in an outer casing 18. In various embodiments, the core engine 16 is generally a Brayton cycle system configured to drive the fan assembly 14. The core engine 16 is shrouded, at least in part, by an outer casing 18. The fan assembly 14 includes a plurality of fan blades 13. A vane assembly 20 is extended from the outer casing 18. The vane assembly 20 including a plurality of vanes 15 is positioned in operable arrangement with the fan blades 13 to provide thrust, control thrust vector, abate or re-direct undesired acoustic noise, or otherwise desirably alter a flow of air relative to the fan blades 13.

In certain embodiments, such as depicted in FIGS. 1-2, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13. In certain embodiments, such as depicted at FIG. 2, the adjustable pitch fan blades 13 may control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above.

In various embodiments, such as depicted in FIG. 1, the engine 10 is a ducted thrust producing system. The engine 10 may be configured as a turbofan with a nacelle or fan casing 54 surrounding the plurality of fan blades. 13. In certain embodiments, such as depicted in FIG. 2, the engine 10 is an un-ducted thrust producing system, such that the plurality of fan blades 13 is unshrouded by a nacelle or fan casing. As such, in various embodiments, the engine 10 may be configured as an unshrouded turbofan engine, an open rotor engine, or a propfan engine. In particular embodiments, the engine 10 is a single unducted rotor engine including a single row of fan blades 13.

The engine 10 may be configured as a low-bypass or high-bypass engine having suitably sized fan blades 13. The engine 10 configured as an open rotor engine may include the fan assembly 14 having large-diameter fan blades 13, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally high cruise speed than aircraft with turboprop engines), and/or relatively low rotational speeds. Cruise altitude is generally an altitude at which an aircraft levels after climb and prior to descending to an approach flight phase.

Referring now to FIG. 3, an exemplary embodiment of the core engine 16 is provided. The core engine 16 includes a compressor section 21, a heat addition system 26, and a turbine section 33 together in serial flow arrangement. The core engine 16 is extended circumferentially relative to an engine centerline axis 12. The core engine 16 includes a high-speed spool that includes a high-speed compressor 24 and a high-speed turbine 28 operably rotatably coupled together by a high-speed shaft 22. The heat addition system 26 is positioned between the high-speed compressor 24 and the high-speed turbine 28. Various embodiments of the heat addition system 26 include a combustion section. The combustion section may be configured as a deflagrative combustion section, a rotating detonation combustion section, a pulse detonation combustion section, or other appropriate heat addition system. The heat addition system 26 may be configured as one or more of a rich-burn system or a lean-burn system, or combinations thereof. In still various embodiments, the heat addition system 26 includes an annular combustor, a can combustor, a cannular combustor, a trapped vortex combustor (TVC), or other appropriate combustion system, or combinations thereof.

Referring still to FIG. 3, the core engine 16 includes a booster or low-speed compressor 23 positioned in flow relationship with the high-speed compressor 24. The low-speed compressor 23 is rotatably coupled with the turbine section 33 via a driveshaft 29. Various embodiments of the turbine section 33 further include a first turbine rotor assembly 30 and a second turbine rotor assembly 32 interdigitated with one another. The first turbine rotor assembly 30 and the second turbine rotor assembly 32 are each operably connected to a gear assembly 300 to provide power to the fan assembly 14 and the low-speed compressor 23, such as described further herein. In certain embodiments, the first turbine rotor assembly 30 and the second turbine rotor assembly 32 are together positioned downstream of the high-speed turbine 28.

It should be appreciated that the terms "low" and "high", or their respective comparative degrees (e.g., —er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

In certain embodiments, such as depicted in FIG. 3, the core engine 16 includes one or more interdigitated structures at the compressor section 21 and/or the turbine section 33. In one embodiment, the turbine section 33 includes the second turbine rotor assembly 32 interdigitated with the first turbine rotor assembly 30, such as via a rotating outer shroud, drum, casing, or rotor. It should be appreciated that embodiments of the turbine section 33 may include the first and/or second turbine 30, 32 interdigitated with one or more stages of the high-speed turbine 28. In another embodiment, the compressor section 21 includes the low-speed compressor 23 interdigitated with the high-speed compressor 24. For instance, the higher speed compressor, such as the high-speed compressor 24, may be a first compressor interdigitated with the lower speed compressor, such as the low-speed compressor 23.

Certain embodiments of the gear assembly 300 depicted and described herein allow for gear ratios and arrangements providing for proportional rotational speed of the fan assembly 14 relative to the turbine section 33. Various embodiments of the gear assembly 300 provided herein may include gear ratios of up to 14:1. Still various embodiments of the gear assembly provided herein may include gear ratios greater than 1:1. In certain embodiments, the gear ratio is at least 3:1. Still yet various embodiments of the gear assembly provided herein include gear ratios between 3:1 to 12:1 for an epicyclic gear assembly or compound gear assembly. The second rotor speed provided herein may be proportionally greater than the first rotor speed corresponding to the gear ratio, e.g., the second rotor speed generally greater than the first rotor speed, or 3× greater, or 7× greater, or 9× greater, or 11× greater, or up to 14× greater, etc. than the first rotor speed.

Although depicted as an un-shrouded or open rotor engine, it should be appreciated that aspects of the disclosure provided herein may be applied to shrouded or ducted engines, partially ducted engines, aft-fan engines, or other turbomachine configurations, including those for marine, industrial, or aero-propulsion systems. Certain aspects of the disclosure may be applicable to turbofan, turboprop, or turboshaft engines, such as turbofan, turboprop, or turboshaft engines with reduction gear assemblies.

Referring now to FIGS. 4-7, embodiments of a portion of a turbine section 33 such as may be provided with the engine 10 of FIGS. 1-3. An axial direction A co-directional to the engine centerline axis 12 and a radial direction R extended from engine centerline axis 12 are provided for reference. A circumferential direction C relative to the engine centerline axis 12 is provided for reference. The turbine section 33 includes an interdigitated turbine assembly 100 including the first turbine rotor assembly 30 interdigitated with the second turbine rotor assembly 32. The first turbine rotor assembly 30 includes a plurality of first rotors 301 extended outward along the radial direction R. The first rotor 301 may be formed as a bladed disk or integrally bladed rotor, or as a blade-and-disk assembly including separable blades attached to a disk, drum or rotor.

In various embodiments, the first turbine rotor assembly 30 includes a bearing hub 303 extended along the axial direction A. The bearing hub 303 is configured to receive and couple to bearing assemblies such as further described herein. In still various embodiments, the first turbine rotor assembly 30 is coupled to the inner rotatable component 351 of the gear assembly 300. In a particular embodiment, the first turbine rotor assembly 30 is coupled to the gear assembly 300 via the bearing hub 303. In a still particular embodiment, the bearing hub 303 is connected to a sun shaft 355 at the gear assembly 300. In such embodiments, the sun shaft 355 is connected to the inner rotatable component 351. The inner rotatable component 351 may generally form a sun gear of the gear assembly 300. In certain embodiments, the sun shaft 355 includes a flexible coupling 356. The bearing hub 303 may be attached to the sun shaft 355 via the flexible coupling 356.

The second turbine rotor assembly 32 includes a plurality of second rotor blades 321 extended inward along the radial direction R from a rotatable drum 323. The rotatable drum 323 is extended along the axial direction A and outward along the radial direction R of the first turbine rotor assembly 30 and the second turbine rotor 32. The rotatable drum 323 provides support and fixture to the second rotor blades 321. Although not further depicted, the first turbine rotor assembly 30 and/or the second turbine rotor assembly 32 may include seals, shims, fasteners, or other components for attaching blades onto a disk, drum, rotor, or similar structure, or further for reducing undesired flow leakages or providing desired thermal responses.

The second turbine rotor assembly 32 may further include a rotatable frame 325 configured to provide structural support for the rotatable drum 323 and second rotor blades 321. In certain embodiments, the rotatable drum 323 is cantilevered from the rotatable frame 325. The second turbine assembly 32 may still further include an annular rotatable hub 326. In some embodiments, the hub 326 is extended at least partially along the radial direction R.

The turbine section 33 includes a first static frame 41 positioned forward along the axial direction A of the first turbine rotor assembly 30 and the second turbine rotor assembly 32. In certain embodiments, a second static frame 42 is positioned aft along the axial direction A of the first turbine rotor assembly 30 and the second turbine rotor assembly 32. In a particular embodiment, a turbine casing 43 is extended along the axial direction A and connects the first static frame 41 to the second static frame 42. The turbine casing 43 may circumferentially surround the interdigitated turbine assembly 100. The first static frame 41 and the turbine casing 43 may be coupled or joined together via a first flange 431. The second static frame 42 and the turbine casing 43 may be coupled or joined together via a second flange 432. The first flange 431 may particularly be positioned forward along the axial direction A of the first turbine rotor assembly 30. The second flange 432 may particularly be positioned aft along the axial direction A of the first flange 431. The flanges 431, 432 and positionings thereof may advantageously allow for desired assembly and disassembly to forward portions of the engine 10, such as further described herein.

The first turbine rotor assembly 30 and the second turbine rotor assembly 32 are each operably connected to the gear assembly 300. The gear assembly 300 includes an inner rotatable component 351, a static structure 358, and an outer rotatable component 352. The first turbine rotor assembly 30 is operably coupled to the inner rotatable component 351. The second turbine rotor assembly 32 is operably coupled to the outer rotatable component 352. In particular embodiments, the hub 326 of the second turbine rotor assembly 32 is connected to the rotatable frame 325 and the outer rotatable component 352 of the gear assembly 300. In certain embodiments, the outer rotatable component 352 is a ring gear operably connected to the second turbine rotor assembly 32 and the driveshaft 29. The outer rotatable component 352 is configured to receive power or torque from the second turbine rotor assembly 32 and transfer to the drive shaft 29. In a particular embodiment, a driveshaft coupling 291 is extended substantially along the radial direction R and connects the outer rotatable component 352 to the driveshaft 29. The driveshaft coupling 291 may be configured as a flexible coupling, such as to allow for torsion or twisting relative to the driveshaft 29 and the outer rotatable component 352.

In various embodiments, a first flexible coupling 353 connects the second turbine rotor assembly 32 to the outer rotatable component 352 of the gear assembly 300. In a particular embodiment, the first flexible coupling 353 connects the hub 326 of the second turbine rotor assembly 32 to the outer rotatable component 352. The first flexible coupling 353 is configured to allow for torsion or twisting relative to power and torque from the second turbine rotor assembly 32 and transferred to the outer rotatable component 352. For instance, torsion or twisting may result from load changes (e.g., changes in energy received from hot gases from the heat addition system 26) received at the second turbine rotor assembly 32 relative to movement, or changes in movement, at the gear assembly 300.

In another embodiment, a second flexible coupling 354 connects the outer rotatable component 352 of the gear assembly 300 to the driveshaft 29. The second flexible coupling 354 is generally configured to allow for torsion or twisting relative to loads, power, or torque received from the first turbine rotor assembly 30 and inner rotatable component 351 (e.g., via gears 357, such as planet gears) and/or from the second turbine rotor assembly 32, and transferred to the driveshaft 29. For instance, torsion or twisting may result from load changes received from the outer rotatable component 352 relative to movement, or changes in movement, at the driveshaft 29. In still particular instances, torsion or twisting may result from load changes at the fan assembly 14 (FIGS. 1-3), such as via fan blade pitch changes, vane pitch changes, changes in operating condition, or debris strike or blade-out events. In certain instances, the configuration of one or both flexible couplings 353, 354 may be particularly advantageous for highly-loaded fan assemblies 14 and interdigitated turbine assemblies, such as provided and further described herein.

In particular embodiments, such as depicted in FIGS. 4-5, the second flexible coupling 354 connects the outer rotatable component 352 to the driveshaft 29 via the driveshaft coupling 291. In a still particular embodiment, the driveshaft coupling 291 may be configured as substantially stiff relative to one or both of the first flexible coupling 353 or the second flexible coupling 354. The second turbine rotor assembly 32 may be connected to the driveshaft 29 in serial loading arrangement through the first flexible coupling 353, the outer rotatable component 352, and the second flexible coupling 354. The second turbine rotor assembly 32 may further be connected to the driveshaft 29 in serial loading arrangement through the first flexible coupling 353, the outer rotatable component 352, the second flexible coupling 354, and the driveshaft coupling 291.

In one embodiment such as depicted herein, the first turbine rotor assembly 30 is configured as a higher-speed rotor relative to the second turbine rotor assembly 32. In a particular embodiment, the engine 10 includes the high-speed turbine 28 (FIG. 3) positioned forward along the axial direction A of the first static frame 41. The high-speed turbine 28 is configured to operate at a highest-speed relative to the first turbine rotor assembly 30 and the second turbine rotor assembly 32. The first turbine rotor assembly 30 is configured to operate at a higher-speed than the second turbine rotor assembly 32.

Referring still to FIGS. 4-7, the static structure 358 of the gear assembly 300 is connected to the first static frame 41. In certain embodiments, the first static frame 41 includes a first static shaft 411 and a second static shaft 412 each extended along the axial direction A. The static shafts 411, 412 extend annularly relative to the engine centerline axis 12. In one embodiment, the static structure 358 is connected to the first static shaft 411 of the first static frame 41. The static structure 358 of the gear assembly 300 provides statically determinative support to the inner rotatable component 351, the outer rotatable component 352, and the gears 357. However, it should be appreciated that other gear arrangements may be applied to provide statically determinative support to the inner rotatable component 351 and the outer rotatable component 352. In certain embodiments, the first static shaft 411 and the second static shaft 412 are extended from a radially extended and annular static hub 413 of the first static frame 41. In still particular embodiments, the first static shaft 411 and the second static shaft 412 are each extended aft along the axial direction A toward the gear assembly 300. In various embodiments, The driveshaft 29 is operably coupled to the outer rotatable component 352 of the gear assembly 300. In particular embodiments, the driveshaft 29 is extended along the axial direction A inward along the radial direction R of the first static shaft 411 of the first static frame 41. A first bearing assembly 221 is operably coupled to the driveshaft 29 and the first static frame 41. As such, the first bearing assembly 221 is positioned at a static-to-rotating interface between the driveshaft 29 and the first static frame 41. In a particular embodiment, the first bearing assembly 221 is operably coupled to the first static frame 41 at the first static shaft 411. In a still particular embodiment, the first bearing assembly 221 is operably coupled to the driveshaft 29 and the first static frame 41 at the first static shaft 411, and the driveshaft 29 is positioned inward along the radial direction R of the first static shaft 411.

A second bearing assembly 222 operably coupled to the first static frame 41 and first turbine rotor assembly 30. As such, the second bearing assembly 222 is positioned at a static-to-rotating interface between the first turbine rotor assembly 30 and the first static frame 41. In various embodiments, the second bearing assembly 222 is operably coupled to the first static frame 41 at the second static shaft 412.

A third bearing assembly 223 is operably coupled to the first turbine rotor assembly 30 and the second turbine rotor assembly 32. As such, the third bearing assembly 223 is positioned at a rotating-to-rotating interface between the first turbine rotor assembly 30 and the second turbine rotor assembly 32. In a particular embodiment, the first turbine rotor assembly 30 includes the bearing hub 303 extended along the axial direction A. In still particular embodiments, at least a portion of the bearing hub 303 is positioned inward along the radial direction R of the second static shaft 412. The second bearing assembly 222 is positioned inward along the radial direction R of the second static shaft 412. As such, the relatively stiff first static frame 41 provides sufficient support along the radial direction R to the first turbine rotor assembly 30 via the second bearing assembly 222 positioned radially between the second static shaft 412 and the bearing hub 303.

In particular embodiments, the third bearing assembly 223 is connected to the hub 326 of the second turbine rotor assembly 32 and to the bearing hub 303 of the first turbine rotor assembly 30. In one embodiment, the third bearing assembly 223 is positioned radially between the bearing hub 303 and the hub 326.

In various embodiments, the first bearing assembly 221 is configured as a radial load bearing (i.e., loads primarily along radial direction R). In particular embodiments, the second bearing assembly 222 and the third bearing assembly 223 are each configured as an overturning moment (OTM) bearing (i.e., a bearing arrangement for transferring an overturning moment). The third bearing assembly 223 is configured to transfer OTM from the second turbine rotor assembly 32 to the first turbine rotor assembly 30. The second bearing assembly 222 is configured to transfer OTM from the first turbine rotor assembly 30 to the first static frame 41. The second bearing assembly 222 and the third bearing assembly 223 are configured as thrust bearings, such as configured for loads along the axial direction A. In certain embodiments, the thrust bearings include a pair of tapered roller bearings, spherical roller bearings, or ball bearings. For instance, each respective bearing assembly 222, 223 may include a pair of rolling bearing elements configured for loads along the axial direction A. The bearings further provide support along the radial direction R.

Referring to FIG. 4, the second bearing assembly 222 and the third bearing assembly 223 are each configured as pairs of tapered roller bearings, such as to receive loads along both axial directions. The tapered roller bearings may generally receive greater loads than similarly-sized ball bearings.

Referring to FIG. 5, the second bearing assembly 222 is configured as a pair of ball bearings. The third bearing assembly 223 is configured as a ball bearing paired with a radial load bearing such as a roller bearing. The third bearing assembly 223 configured as one or more ball bearings may be loaded due to thermal growth to desirably maintain a position the second turbine rotor assembly 32. The turbine rotor assembly is mounted on the ball bearing, such as to allow the turbine rotor assembly to "float" or be substantially supported by the OTM bearings and allow the second static frame 42 to be substantially non-structural, such as to allow for reduced weight and improve engine efficiency and performance.

Referring to FIG. 6, the second bearing assembly 222 is configured as a pair of ball bearings and the third bearing assembly 223 is configured as a pair of radial load bearings, such as roller bearings. The second turbine rotor assembly 32 further includes a connection member 359 to the driveshaft coupling 291. The second turbine rotor assembly 32 may be connected to the driveshaft 29 in direct serial loading arrangement through the hub 326, the connection member 359, and the driveshaft coupling 291. The outer rotatable component 352 may be connected to a flange at the hub 326 and the connection member 359. Thrust load from the second turbine rotor assembly 32 may be taken through the serial loading arrangement to the driveshaft 29 and via a thrust bearing positioned at a forward end of the engine, such as at the fan assembly 14 or the compressor section 21.

Referring to FIG. 7, the second bearing assembly 222 is configured as a pair of tapered roller bearings, such as described in regard to FIG. 4. The third bearing assembly 223 is configured as a ball bearing paired with a radial load bearing such as a roller bearing, such as described in regard to FIG. 5. The flexible coupling 356 and the sun shaft 355 are positioned inward along the radial direction R of the third bearing assembly 223, allowing for a reduced radial dimension of the hub 326 from the third bearing assembly 223 to the connection member 359. The reduced radial dimension of the hub 326 may allow for greater turbine rotor assembly diameters or reduce or mitigate issues associated with undesired rotor dynamics, rotor whirl, or rotor balance.

Referring still to FIG. 7, positioning the flexible coupling 356 radially inward of the third bearing assembly 223 may allow the ball bearing of the third bearing assembly 223 to be of greater diameter or radial dimension compared to the tapered roller bearings at the third bearing assembly 223 depicted at FIG. 4. The embodiment depicted in FIG. 4 including tapered roller bearings allows for receiving relatively large radial and axial loads while being positioned inward of the disks, such as to allow for relatively compact radial dimensions of the turbine assembly or mitigate undesired increases to turbine rotor diameter. Embodiments depicted in FIGS. 5-7 including ball bearings and radial load bearings such as roller bearings at the third bearing assembly 223 maybe configured to allow at least a portion of axial load to be taken via a thrust bearing positioned at a forward end of the engine, such as at the fan assembly 14 or the compressor section 21.

The second static frame 42 may generally surround or "float" radially around the gear assembly 300. It should be appreciated that the second static frame 42 may couple or connect to the gear assembly 300 to provide fluid sealing. However, particular arrangements of the bearing assemblies 221, 222, 223 for the interdigitated turbine assembly 100 allow for loads to be supported and pass substantially through the first static frame 41. As such, embodiments of the engine 10, turbine section 33, or interdigitated turbine assembly 100 including arrangements of the bearing assemblies 221, 222, 223 provided herein allow for the second static frame 42 to be substantially non-structural. As the bearing assemblies 221, 222, 223 are supported from the first static frame 41, the second static frame 42 may have fewer or eliminated supply and scavenge conduits for lubricant or air. Such reduced structures may allow for reduced engine weight, improved turbine section assembly and disassembly, and improved maintenance. Additionally, or alternatively, arrangements of the bearing assemblies 221, 222, 223 and interdigitated turbine assembly 100 provided herein allow for improved rotor dynamics, such as to mitigate N1 modes.

Still further, particular arrangements of the bearing assemblies 221, 222, 223, the interdigitated turbine assembly 100, and the flexible couplings 353, 354, 356 may provide improved dynamic response, mitigate undesired vibration or dynamic modes, and allow for high-speed operation of the interdigitated turbine assembly 100. The interdigitated turbine assembly 100 may allow for relatively high-speed operation of a low pressure turbine assembly connected to the fan assembly 14. The relatively high speed of the interdigitated turbine assembly 100, or particularly the first turbine rotor assembly 30, may allow for gear ratios such as provided herein. Such arrangements may allow for improved specific fuel consumption, higher thrust output, and/or reduced noise relative to similar thrust output engines.

Embodiments depicted and described herein may further include benefits over known structures and methods for assembly and disassembly for interdigitated turbines. Such benefits may include preassembly of a counter-rotating interdigitated turbine rotor assembly, or alternatively, preassembly of the rotor assembly and the gear assembly together, such as to allow for handling, movement, shipment, replacement, or maintenance separate from upstream portions of the engine 10 (i.e. at or forward of the first static frame 41). Benefits may additionally, or alternatively, include forming the gear assembly 300 separable from the interdigitated turbine assembly 100, such as to allow for assembly and disassembly of the gear assembly 300 separate from the interdigitated turbine assembly 100 and upstream portions of the engine 10. Furthermore, such benefits may allow for horizontal (i.e., along the axial direction A) assembly and disassembly, inspection, maintenance, or repair, of the gear assembly 300 and the interdigitated turbine assembly 100. Horizontal assembly and disassembly may allow for on-aircraft (e.g., on-wing, on-fuselage, etc.) or in-situ assembly and disassembly of at least a portion of the engine 10, such as the interdigitated turbine rotor assembly 100 and gear assembly 300, such as to improve engine maintainability and reduce cost of operation and ownership.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

An interdigitated turbine assembly for a gas turbine engine, the interdigitated turbine assembly comprising a first turbine rotor assembly interdigitated with a second turbine rotor assembly; a first static frame positioned forward of the first turbine rotor assembly and the second turbine rotor assembly; a gear assembly comprising an inner rotatable component, a static structure, and an outer rotatable component, wherein the first turbine rotor assembly is operably coupled to the inner rotatable component, and wherein the second turbine rotor assembly is operably coupled to the outer rotatable component, and wherein the static structure is connected to the first static frame; a driveshaft operably coupled to the outer rotatable component of the gear assembly; a first bearing assembly operably coupled to the driveshaft and the first static frame; a second bearing assembly operably coupled to the first static frame and first turbine rotor assembly; and a third bearing assembly operably coupled to the first turbine rotor assembly and the second turbine rotor assembly.

2. The interdigitated turbine assembly of any clause herein, wherein the second bearing assembly is an overturning moment bearing.

3. The interdigitated turbine assembly of any clause herein, wherein the third bearing assembly is an overturning moment bearing and a rotor-to-rotor bearing.

4. The interdigitated turbine assembly of any clause herein, wherein the first static frame comprises a first static shaft and a second static shaft each extended along an axial direction.

5. The interdigitated turbine assembly of any clause herein, wherein the first bearing assembly is operably coupled to the first static frame at the first static shaft.

6. The interdigitated turbine assembly of any clause herein, wherein the second bearing assembly is operably coupled to the first static frame at the second static shaft.

7. The interdigitated turbine assembly of any clause herein, wherein the driveshaft is extended along the axial direction inward along a radial direction of the first static shaft of the first static frame.

8. The interdigitated turbine assembly of any clause herein, wherein the first turbine rotor assembly comprises a bearing hub extended along the axial direction inward along the radial direction of the second static shaft of the first static frame, and wherein the second bearing assembly is positioned at the bearing hub at the first turbine rotor assembly.

9. The interdigitated turbine assembly of any clause herein, wherein the first static frame comprises a first static shaft and a second static shaft each extended along an axial direction, wherein the first bearing assembly is operably coupled to the driveshaft and the first static frame at the first static shaft, and wherein the driveshaft is positioned inward along a radial direction of the first static shaft.

10. The interdigitated turbine assembly of any clause herein, wherein the second bearing assembly is operably coupled to the first turbine rotor assembly and the second static shaft, and wherein the second bearing assembly is operably coupled to inward along the radial direction of the second static shaft, and wherein the second bearing assembly is positioned inward along the radial direction of the second static shaft.

11. The interdigitated turbine assembly of any clause herein, wherein the outer rotatable component of the gear assembly is a ring gear operably connected to the second turbine rotor assembly and the driveshaft.

12. The interdigitated turbine assembly of any clause herein, wherein the first turbine rotor assembly is configured as a higher speed turbine rotor relative to the second turbine rotor assembly configured as a lower speed turbine rotor.

13. The interdigitated turbine assembly of any clause herein, the interdigitated turbine assembly comprising a first flexible coupling connecting the second turbine rotor assembly to the outer rotatable component of the gear assembly; and a second flexible coupling connecting the outer rotatable component of the gear assembly to the driveshaft.

14. The interdigitated turbine assembly of any clause herein, wherein the first turbine rotor assembly comprises a plurality of first rotors extended outward along a radial direction, and wherein the second turbine rotor assembly comprises a plurality of second rotor blades extended inward along the radial direction from a rotatable drum.

15. The interdigitated turbine assembly of any clause herein, the interdigitated turbine assembly comprising a second static frame positioned aft of the first turbine rotor assembly and the second turbine rotor assembly.

16. The interdigitated turbine assembly of any clause herein, wherein the third bearing assembly is a thrust bearing.

17. The interdigitated turbine assembly of any clause herein, wherein the thrust bearing is a pair of tapered roller bearings, spherical roller bearings, or ball bearings.

18. The interdigitated turbine assembly of any clause herein, wherein the second bearing assembly is the thrust bearing.

19. The interdigitated turbine assembly of any clause herein, wherein the first bearing assembly is a radial load bearing.

20. The interdigitated turbine assembly of any clause herein, wherein the second bearing assembly is a pair of tapered roller bearings.

21. The interdigitated turbine assembly of any clause herein, wherein the second bearing assembly is a pair of ball bearings.

22. The interdigitated turbine assembly of any clause herein, wherein the third bearing assembly is a pair of radial load bearings.

23. The interdigitated turbine assembly of any clause herein, wherein the third bearing assembly is a ball bearing paired with a radial load bearing.

24. The interdigitated turbine assembly of any clause herein, wherein a flexible coupling is connected to the third bearing assembly and a sun shaft.

25. The interdigitated turbine assembly of any clause herein, wherein the flexible coupling is positioned inward along a radial direction of the third bearing assembly.

26. The interdigitated turbine assembly of any clause herein, wherein the second turbine rotor assembly is coupled to the driveshaft in serial load arrangement through a first flexible coupling, the outer rotatable component of the gear assembly, and a second flexible coupling.

27. The interdigitated turbine assembly of any clause herein, wherein the second turbine rotor assembly is coupled to the driveshaft in serial load arrangement through a first flexible coupling, the outer rotatable component of the gear assembly, a second flexible coupling, and a driveshaft coupling.

28. The interdigitated turbine assembly of any clause herein, wherein the second turbine rotor assembly is in serial load arrangement with the driveshaft from a hub through a connection member.

29. A gas turbine engine comprising the interdigitated turbine assembly of any clause herein.

What is claimed is:

1. An interdigitated turbine assembly for a gas turbine engine, the interdigitated turbine assembly comprising:
    a first turbine rotor assembly interdigitated with a second turbine rotor assembly;
    a first static frame positioned forward of the first turbine rotor assembly and the second turbine rotor assembly;
    a gear assembly comprising an inner rotatable component, a static structure, and an outer rotatable component, wherein the first turbine rotor assembly is operably coupled to the inner rotatable component, and wherein the second turbine rotor assembly is operably coupled to the outer rotatable component, and wherein the static structure is connected to the first static frame;
    a second static frame positioned aft of the first turbine rotor assembly and the second turbine rotor assembly, the second static frame configured to float radially around the gear assembly;
    a driveshaft operably coupled to the outer rotatable component of the gear assembly;
    a first bearing assembly operably coupled to the driveshaft and the first static frame;
    a second bearing assembly operably coupled to the first static frame and first turbine rotor assembly; and
    a third bearing assembly operably coupled to the first turbine rotor assembly and the second turbine rotor assembly.

2. The interdigitated turbine assembly of claim 1, wherein the second bearing assembly is an overturning moment bearing.

3. The interdigitated turbine assembly of claim 1, wherein the third bearing assembly is an overturning moment bearing and a rotor-to-rotor bearing.

4. The interdigitated turbine assembly of claim 1, wherein the first static frame comprises a first static shaft and a second static shaft each extended along an axial direction.

5. The interdigitated turbine assembly of claim 4, wherein the first bearing assembly is operably coupled to the first static frame at the first static shaft.

6. The interdigitated turbine assembly of claim 4, wherein the second bearing assembly is operably coupled to the first static frame at the second static shaft.

7. The interdigitated turbine assembly of claim 4, wherein the driveshaft is extended along the axial direction inward along a radial direction of the first static shaft of the first static frame.

8. The interdigitated turbine assembly of claim 7, wherein the first turbine rotor assembly comprises a bearing hub extended along the axial direction inward along the radial direction of the second static shaft of the first static frame, and wherein the second bearing assembly is positioned at the bearing hub at the first turbine rotor assembly.

9. The interdigitated turbine assembly of claim 1, wherein the first static frame comprises a first static shaft and a second static shaft each extended along an axial direction, wherein the first bearing assembly is operably coupled to the driveshaft and the first static frame at the first static shaft, and wherein the driveshaft is positioned inward along a radial direction of the first static shaft.

10. The interdigitated turbine assembly of claim 1, wherein the second bearing assembly is operably coupled to the first turbine rotor assembly and a second static shaft, and wherein the second bearing assembly is positioned inward along a radial direction of the second static shaft.

11. The interdigitated turbine assembly of claim 1, wherein the outer rotatable component of the gear assembly is a ring gear operably connected to the second turbine rotor assembly and the driveshaft.

12. The interdigitated turbine assembly of claim 1, wherein the first turbine rotor assembly is configured as a higher speed turbine rotor relative to the second turbine rotor assembly configured as a lower speed turbine rotor.

13. The interdigitated turbine assembly of claim 1, the interdigitated turbine assembly comprising:
    a first flexible coupling connecting the second turbine rotor assembly to the outer rotatable component of the gear assembly; and
    a second flexible coupling connecting the outer rotatable component of the gear assembly to the driveshaft.

14. The interdigitated turbine assembly of claim 1, wherein the first turbine rotor assembly comprises a plurality of first rotors extended outward along a radial direction, and wherein the second turbine rotor assembly comprises a plurality of second rotor blades extended inward along the radial direction from a rotatable drum.

15. The interdigitated turbine assembly of claim 1, wherein the third bearing assembly is a thrust bearing.

16. The interdigitated turbine assembly of claim 15, wherein the thrust bearing is a pair of tapered roller bearings, spherical roller bearings, or ball bearings.

17. The interdigitated turbine assembly of claim 1, wherein the second bearing assembly is a thrust bearing, wherein the second bearing assembly is a pair of tapered roller bearings.

18. The interdigitated turbine assembly of claim 1, wherein the first bearing assembly is a radial load bearing.

19. A gas turbine engine, the gas turbine engine comprising the interdigitated turbine assembly of claim 1.

* * * * *